United States Patent [19]
Nakamura

[11] Patent Number: 6,055,266
[45] Date of Patent: Apr. 25, 2000

[54] SPREAD SPECTRUM PULSE POSITION MODULATION COMMUNICATION SYSTEM

[75] Inventor: Masaru Nakamura, Kanagawa, Japan

[73] Assignee: Ricoh Company, Ltd., Tokyo, Japan

[21] Appl. No.: 08/908,164

[22] Filed: Aug. 7, 1997

[30] Foreign Application Priority Data

Aug. 9, 1996 [JP] Japan .................................. 8-211641
Sep. 13, 1996 [JP] Japan .................................. 8-242833

[51] Int. Cl.$^7$ ...................................................... H04K 1/02
[52] U.S. Cl. .......................... 375/206; 375/208; 375/239; 370/213
[58] Field of Search ................................. 375/200, 207, 375/208, 204, 239, 206; 370/213

[56] References Cited

U.S. PATENT DOCUMENTS

| | | |
|---|---|---|
| 5,216,693 | 6/1993 | Nakamura . |
| 5,303,258 | 4/1994 | Nakamura . |
| 5,438,589 | 8/1995 | Nakamura . |
| 5,469,469 | 11/1995 | Haines ..................................... 375/201 |
| 5,596,601 | 1/1997 | Bar-David .............................. 375/207 |
| 5,706,428 | 1/1998 | Boer et al. ............................... 395/200 |
| 5,859,870 | 1/1999 | Tsujimoto ................................ 375/200 |

FOREIGN PATENT DOCUMENTS

| | | |
|---|---|---|
| 4-113732 | 4/1992 | Japan . |
| 4-137835 | 5/1992 | Japan . |
| 8-79133 | 3/1996 | Japan . |

OTHER PUBLICATIONS

Isao Okazaki, et al. "A Study on Multiplexing of Spread-Spectrum Pulse Position Modulation", SST91–18, May, 1991, pp. 17–22.

Isao Okazaki, et al., "Spread Spectrum Pulse Position Modulation", A Simple Approach for Shannon's Limit, IEICE Trans. Commun., vol. E76–B, No. 8 Aug. 1993, pp. 929–940.

U.S. application No. 08/908,164, filed Aug. 7, 1997, pending.

U.S. application No. 09/229,896, filed Jan. 14, 1999, pending.

*Primary Examiner*—Amanda T. Le
*Attorney, Agent, or Firm*—Oblon, Spivak, McClelland, Maier & Neustadt, P.C.

[57] ABSTRACT

A first spread spectrum pulse position modulated signal with a pseudonoise code is generated. A second spread spectrum pulse position modulated signal with an inverted pseudonoise code is generated. A third spread spectrum pulse position modulated signal with a pseudonoise code is generated. A fourth spread spectrum pulse position modulated signal with an inverted pseudonoise code is generated. The first and second spread spectrum pulse position modulated signals are added together and thus a fifth spread spectrum pulse position modulated signal is formed. The third and fourth spread spectrum pulse position modulated signals are added together and thus a sixth spread spectrum pulse position modulated signal is formed. Quadrature modulation is performed on the fifth and sixth spread spectrum pulse position modulated signals.

7 Claims, 16 Drawing Sheets

PULSE POSITION MODULATION (PPM) SYSTEM

SPREAD SPECTRUM PULSE POSITION MODULATION (SS-PPM) SYSTEM

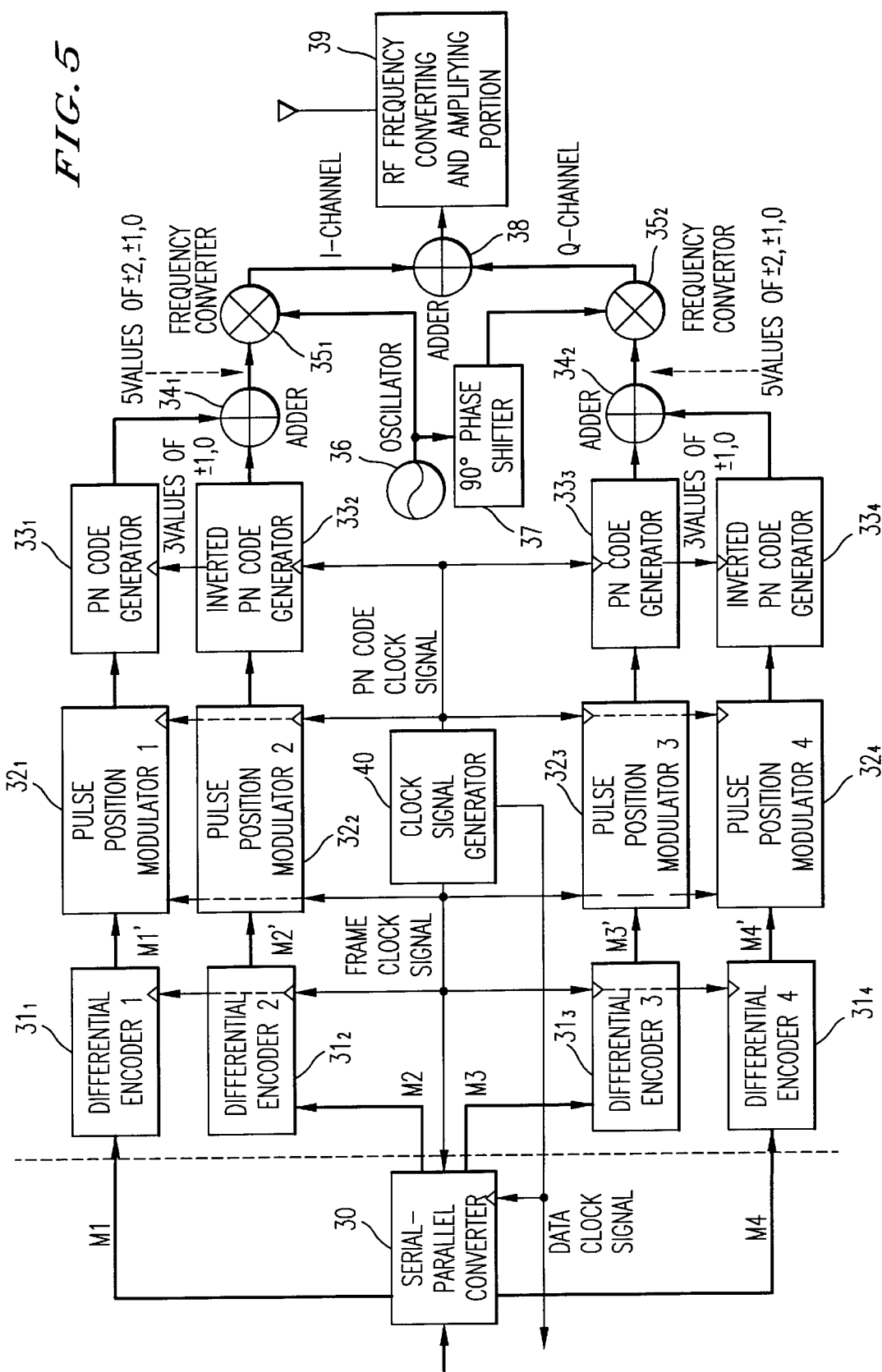

SPREAD SPECTRUM PULSE POSITION MODULATION COMMUNICATION SYSTEM

BACKGROUND OF THE INVENTION

1. Field of the Invention

The present invention relates to a spread spectrum pulse position modulation communication system (for example, for use in indoor radio communication, radio LAN, radio high-speed data communication, etc.).

2. Discussion of the Background

The principle of spread spectrum pulse position modulation is shown in an English paper, Spread Spectrum Pulse Position Modulation written by Isao Okazaki and Takaaki Hasegawa in IEICE TRANS. COMMUN., VOL. E76-B., NO. 8, August, 1993, pages 929–940. The teaching of the paper is hereby incorporated by reference.

With regard to spread spectrum pulse position modulation, Isao Okazaki, Takaaki Hasegawa and Saitama University wrote a Japanese paper entitled *A Study on Multiplexing of Spread-Spectrum Pulse Position Modulation* in SST91-18, pages 17–22.

Japanese Laid-Open Patent Application No. 8-79133 and the corresponding U.S. Pat. No. 5,596,601 (hereinafter "the '601 patent") of AT & T CORP disclose two-signal multiplexing by quadrature modulation.

The inventor of this application is the same as the inventor of U.S. application Ser. No. 08/862,647 (hereinafter "the '647 application") filed on May 23, 1997 now U.S. Pat. No. 5,923,701 which discloses two-signal multiplexing as a result of adding together a spread spectrum pulse position modulation signal with a pseudonoise code and a spread spectrum pulse position modulation signal with the inverted pseudonoise code.

A spread spectrum pulse position modulation communication system in the related art will now be described with reference to FIGS. 1A, 1B, 1C and 1D.

FIG. 1A shows a modulated signal in a case of simple pulse position modulation and shows an example where 4 slots are provided for each frame. For an M value data symbol to be transmitted, one of M slots is selected and a pulse is transmitted. Thus, a pulse position modulation is performed.

FIG. 1B shows a modulated signal of the spread spectrum pulse position modulation communication system which is a system resulting from combining a spread spectrum modulation with the system shown in FIG. 1A. As described in Japanese Laid-Open Patent Application No. 4-137835, in this system, instead of one slot width of a pulse in the pulse position modulation in the related art, a code length L of a pseudonoise code is inserted into L slots starting from a selected slot. Thus, spread modulation is performed. In order to prevent overlapping of signals between adjacent frames, a frame length is longer by more than L−1 slots as compared to the pulse position modulation. Accordingly, the number of slots for each frame is M+L−1+j. When j≧0, signals are not overlapped. When j<0, some overlapping of signals occurs.

In the example of FIG. 1B, one of the M slots starting from the top to be transmitted is selected to correspond to data obtained from differential encoding. The pseudonoise code is inserted into the L slots starting from the selected slot. Thus, spread modulation is performed. In this example, FIG. 1B shows a transmission signal in a case of M=4, L=7 and j=0, and shows a modulated signal in a case where data obtained from differential encoding to be transmitted is 0, 1, 3, etc.

The signal shown in FIG. 1B is input to a matched filter which matches the code the same as the pseudonoise code used in the spread modulation. As a result, a pulse position modulated signal shown in FIG. 1C is reproduced. This is because the autocorrelation characteristics of the pseudonoise code used in the spread modulation are such that, as shown in FIG. 1D, a sharp peak occurs only when a time difference between codes is within one slot period. Then, by obtaining the position of the slot position of the reproduced pulse in each frame, the original data can be reproduced.

FIGS. 2 and 3 show circuit arrangements of a transmitter and a receiver which concretely realize the above-described processes. In the transmitter shown in FIG. 2, a clock signal generator 1 drives (1) a pseudonoise code generator code 9 and (2) a counter 2 (which returns to zero each time (M+L−1+j) pulses are counted). Serial data to be transmitted is converted into a parallel data through a serial-parallel converter 5. Parallel data of one frame before is stored in a register 8, the output value of the register 8 is added to the parallel data from the serial-parallel converter 5 through an adder 6. The output of the adder 6 is fed back to the register 8. Thus, differential encoding is performed. The output value of the register 8 is compared with the value of the counter 2 by a comparator 4. When the values agree, the comparator 4 sends a trigger pulse signal to the pseudonoise code generator 9. Thereby, the pseudonoise code generator 9 generates one period of a pseudonoise code. A detector 3 which detects that the output of the counter 2 becomes a predetermined value generates a frame clock signal. The register 8 operates in synchronization with the frame clock signal. Further, the frequency of this clock signal is multiplied by a PLL 7 or the like, and the resulting clock signal is used in the serial-parallel conversion. The signal from the pseudonoise code generator 9 is multiplied by the signal from an oscillator 11 through a multiplier 10, and thus, is converted into a high-frequency signal. The high-frequency signal passes through a filter 12 and is transmitted as a radio signal through an antenna.

FIG. 3 illustrates the reception portion. In the reception portion, the signal from the transmission portion is received by an antenna and is amplified by an amplifier 20. Then, the thus-obtained signal is multiplied by a local oscillation signal from an oscillator 22 through a multiplier 21. Thereby, the signal is converted into an intermediate frequency signal. This signal passes through a filter 23 and is amplified by a gain controlled amplifier 24. Then, the signal passes through a matched filter 25 which uses the same pseudonoise code as that of the transmission portion. Thereby, inverse spreading is performed and a pulse position modulated signal is reproduced. Detection is performed by a detector 26 at the output of the filter 25, and the signal is converted into a baseband pulse-position modulated signal. Pulse intervals of this signal are measured by a following pulse interval measuring circuit 27. Transmitted data is reproduced from the measured value, and finally, the data is converted into serial data by a parallel-serial converter 28. Thus, the originally transmitted signal is reproduced. In the above-described system in the related art, only the amplitudes of matched pulses are seen.

SUMMARY OF THE INVENTION

An object of the present invention is to provide a spread spectrum pulse position modulation communication system in which the method of the '601 patent using the two-signal multiplexing by quadrature modulation and the method of the '647 patent are combined. Thereby, 4-signal multiplexing can be achieved and high-speed communication can be performed. As a result, it is possible to apply this method to a radio LAN, for example.

The spread spectrum pulse position modulation communication system, according to the present invention, uses a period L of a pseudonoise code. The transmission data includes four data symbols M1, M2, M3 and M4, each of which has a maximum value of M. Each frame includes (M+L−1+j) slots, and the slot rate of each frame is the same as the chip rate of each pseudonoise codes.

The data symbol M1 is differentially encoded to obtain a first value. One slot is then selected from consecutive slots in a frame for the first value. The pseudonoise code is inserted into the L slots which start from the selected slot. The data symbol M2 is similarly differentially encoded to obtain a second value. One slot is selected from consecutive slots in a frame for the second value. The inverted code is inserted into the L slots which start from the selected slot.

The value of the data symbol M3 is differentially encoded to obtain a fourth value. One slot is selected from consecutive slots in a frame for the fourth value. The inverted code is inserted into the L slots which start from the selected slot.

Thus, for the slots at which the pseudonoise code and the inverted code overlap, the sum of the two values is the value of each slot. By repeating those operations, a spread spectrum pulse position modulated signal is generated for each frame successively. For the first and second values, the signal is an I-channel signal. For the third and fourth values, the signal is a Q-channel baseband signal.

Carrier waves having a 90° phase difference therebetween are provided. The I-channel baseband signal is multiplied by one of the carrier waves, and the Q-channel baseband signal is multiplied by the other one of the carrier waves. These multiplied results are added together and thus quadrature modulation is performed. This generated signal is used as a transmission signal, and data transmission is performed.

Thereby, only one pseudonoise code is used for spread modulation, and this code and its inverted code are used. Further, for the two carrier waves which are orthogonal to one another, spread spectrum pulse position modulation by different data symbols is performed. Thereby, it is possible to transmit the four data symbols simultaneously. Thus, in comparison to the case of the simple spread spectrum pulse position modulation communication system in the related art, quad-speed data transmission is achieved. When high-speed data transmission is not needed, data transmission at approximately the same speed as the related art can be achieved with one-fourth of the spread spectrum bandwidth.

A transmitter for a spread spectrum pulse position modulation communication system according to the present invention includes first through fourth differential encoders which receive the data symbols M1 through M4, respectively, and outputs differential-encoded data symbols M1' through M4', respectively. The transmitter also includes first through fourth pulse position modulation circuits. In each frame period, each of the pulse position modulation circuits selects one of the consecutive slots in one frame of (M+L−1+j) slots, and thereby outputs first through fourth pulse position modulated signals.

The transmitter also includes first through fourth pseudonoise code generators which use the first through fourth pulse position modulated signals, respectively, as trigger signals. Those generators output to the following L slots, one period of the pseudonoise code of the period L, and thus perform spread modulations.

The spread modulated signals are then combined. Specifically, a first adder adds together the outputs of the first and second pseudonoise code generators and thus forms the I-channel baseband signal. Then the I-channel signal is frequency inverted by a first multiplier that multiplies a sine wave from an oscillator by the I-channel baseband signal. The result of the multiplication is an I-channel intermediate frequency signal.

Then, a second adder adds together the outputs of the third and fourth pseudonoise code generators. Thus, the Q-channel baseband signal is formed.

Also, a second multiplier multiples (1) a sine wave from the oscillator that is phase-shifted by 90° by (2) the Q-channel baseband signal. Thus, the frequency is converted so as to output a Q-channel intermediate frequency signal.

A third adder adds together these two intermediate frequency signals which are orthogonal to each other, and generates the modulated signal. Optionally, an RF frequency convertor and amplifier performs frequency conversion on the modulated signal and amplifies it so as to form a transmission signal.

Thereby, the four-channel multi-value data symbols are simultaneously transmitted for each frame clock pulse and thus data bit shift is prevented.

The spread spectrum pulse position modulation communication system according the present invention may further include a serial-parallel converter which receives data in serial and converts the data into the four data symbols M1, M2, M3 and M4. Thus, by providing the serial-parallel converter in the data input portion, it is possible to transmit a serial data series.

In a receiver of the spread spectrum pulse position modulation communication system according to the present invention, the system receives a signal from a spread spectrum pulse position modulation transmitter. An RF frequency converting and amplifying portion is provided, if necessary, for amplifying the received signal and converts the signal into an intermediate frequency signal. The intermediate frequency signal is caused to branch into three intermediate frequency signals.

A carrier wave reproducing circuit is provided for generating a reproduced carrier wave from one of the three intermediate frequency signals. The reproduced carrier wave is split into two reproduced carrier waves.

A phase shifter is provided for phase shifting one of the two reproduced carrier waves by 90°. Thus, the generated carrier waves are orthogonal to each other.

Two frequency converters are provided which receive the remaining two intermediate frequency signals and the reproduced carrier waves which are orthogonal to each other. The converters perform quadrature detection and convert the input signals into the 1-channel and Q-channel baseband signals.

Two matched filters are provided, each of which outputs a positive or negative matched pulse when the same pseudonoise code as that of the transmitter or its inverted code is input to the respective one of the two baseband signals. The filters reproduce the pulse position modulated signals including positive and negative pulses.

Two peak amplitude polarity detecting circuits are provided. Each circuit detects a positive pulse and a negative pulse from the respective one of the matched filters, separately, and outputs two peak detection signals.

Four peak interval measuring circuits are provided. Each circuit measures peak interval times for the respective one of the 4 peak detection signals which indicate detection of positive and negative peaks for each of the I channel and the Q channel.

In addition, four data symbol reproducing circuits are provided. The circuits receive the 4 peak interval measured data and reproduce the original data symbols, respectively.

Thus, by reproducing the synchronized carrier wave, the one matched filter can generate matched pulses for the pseudonoise code and for its inverted code. As compared to when the synchronized carrier wave is not reproduced, peak detection for each data symbol can be easily performed, the circuit arrangement of the demodulating portion is simpler, and also, the four-channel multivalue data symbols can be simultaneously demodulated for each frame clock pulse. Thus, data bit shifting can be prevented.

In a receiver for the spread spectrum pulse position modulation communication system according to the present invention, the receiver includes inputs for receiving a signal from a spread spectrum pulse position modulation transmitter. The receiver includes an RF frequency converting and amplifying portion for amplifying the received signal and converting the signal into an intermediate frequency signal, if necessary.

An oscillator also is included which is of a frequency approximately equal to the center frequency of the intermediate frequency signal. The oscillator output is split into two oscillation signals.

A phase shifter is provided for performing 90° phase shifting on one of the two oscillation signals and thus generates local signals which are orthogonal to each other.

The intermediate frequency signal is split into two intermediate frequency signals.

Two frequency converters are provided which receive the two local signals which are orthogonal to each other and the two intermediate frequency signals. The converters perform quadrature detection and convert the input signals into the I-channel quasi-baseband signal and Q-channel quasi-baseband signal.

Two matched filters are provided, each of which, when the same pseudonoise code as that of the transmitter or its inverted code is input to the respective one of the I, Q two quasi-baseband signals, reproduces the pulse position modulated signal including positive and negative pulses.

A peak amplitude phase detection circuit is provided which detects the amplitudes and phases of peaks from each matched filter, detects I-phase positive pulses, I-phase negative pulses, Q-phase positive pulses and Q-phase negative pulses, separately, and outputs four peak detection signals.

Four peak interval measuring circuits are provided, each of which measures peak interval times for the respective one of the 4 peak detection signals which indicate detection of positive and negative peaks for each of the I channel and the Q channel.

Four data symbol reproducing circuits are provided, which receive the 4 peak interval measured data and reproduce the original data symbols, respectively.

Thereby, when the high-frequency radio signal is converted into the baseband signals, it is not necessary to generate strict base band signals. An offset carrier wave is permitted, and carrier wave synchronization reproduction is not needed. Moreover, the arrangement of the frequency converting portion is simplified, and costs are reduced. Further, when radio signal propagation conditions are not good and reproduction of a carrier wave is technically difficult, the above-described receiver arrangement can appropriately operate.

The spread spectrum pulse position modulation communication system according the present invention may further comprise a parallel-serial converter which receives the four demodulated data symbols and converts them into serial data for each frame, thus an output data series is obtained.

Thus, by providing the parallel-serial converter in the data output portion, it is possible to output the received data in series.

In the spread spectrum pulse position modulation communication system according the present invention, the Barker code may be used as the pseudonoise code which is used in spread modulation. Thereby, cross-correlation characteristics can be reduced in comparison to an ordinary periodic code such as M sequences. As a result, an error rate can be reduced and transmission characteristics are improved.

In the spread spectrum pulse position modulation communication system according to the present invention, it is possible that the value of the frame length (M+L−1+j) is equal to or more than twice the maximum value M of the values which each data symbol can have. Thus, slot positions at which positive and negative pulses occur at an output of the matched filters do not overlap.

Thus, the value of the frame length (M+L1+j) is at least twice the maximum value M of the values which each data symbol can have. Thus, in one frame, the slot positions do not overlap between the data symbols M1 and M2 and between the data symbols M3 and M4. Accordingly, a positive peak and a negative peak occurring in the matched filter output of the receiver overlap. As a result, peak determination can be easily performed, and the arrangement of the receiver can be simplified and costs thereof can be reduced. Further, as a result, an error rate can be reduced and transmission characteristics are improved.

Other objects and further features of the present invention will become more apparent from the following detailed description when read in conjunction with the accompanying drawings.

BRIEF DESCRIPTION OF THE DRAWINGS

FIG. 5 illustrates an example of a four-pole SS-PPM system transmitter;

DESCRIPTION OF THE PREFERRED EMBODIMENTS

According to the present invention, matched pulses for four phases, 0, $\pi/2$, $\pi$, $3\pi/2$ are distinguished from each other. Thereby, the matched pulse of each phase can be used as a one-channel pulse position modulated signal. As a result, it is possible to provide a spread spectrum pulse position modulation communication system in which data transmission can be performed four times faster than in the related art.

Figure 1A:
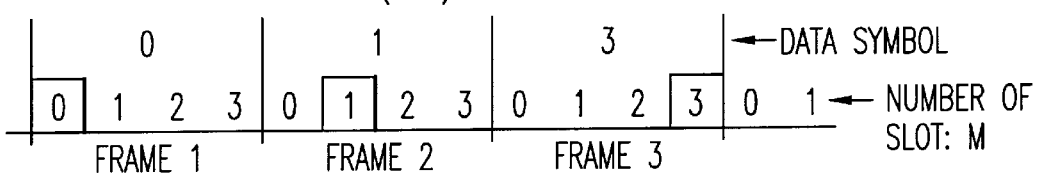
FIGS. 1A, 1B, 1C and 1D illustrate the principle of operation of a spread spectrum pulse position modulation communication system.
Figure 1B:
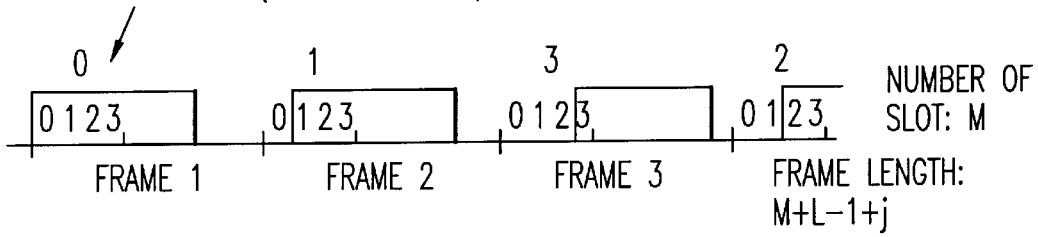
Figure 1C:
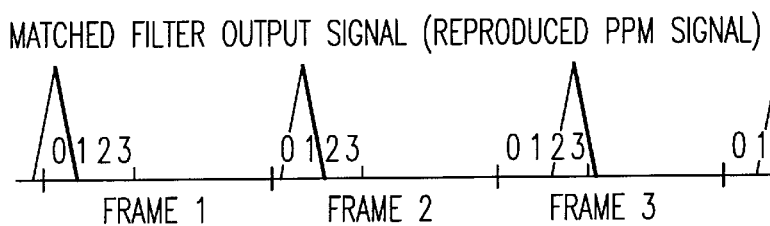
Figure 1D:
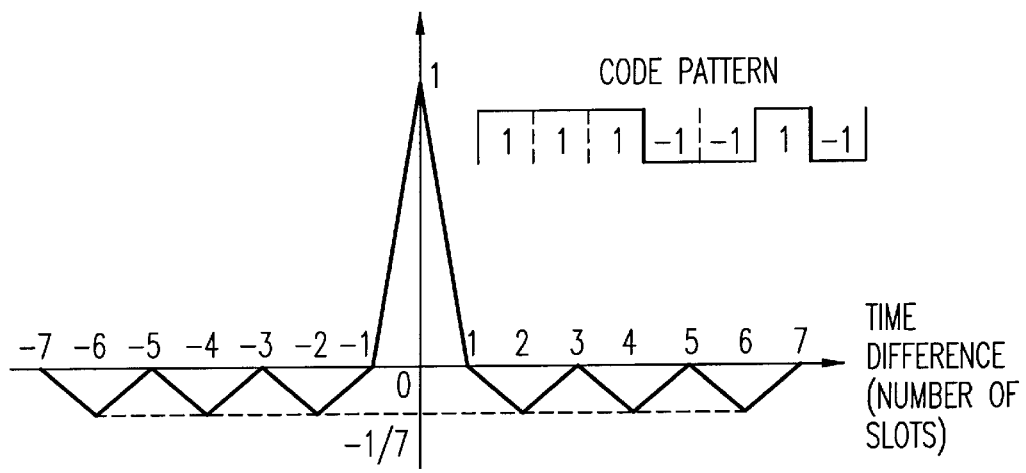
Figure 2:
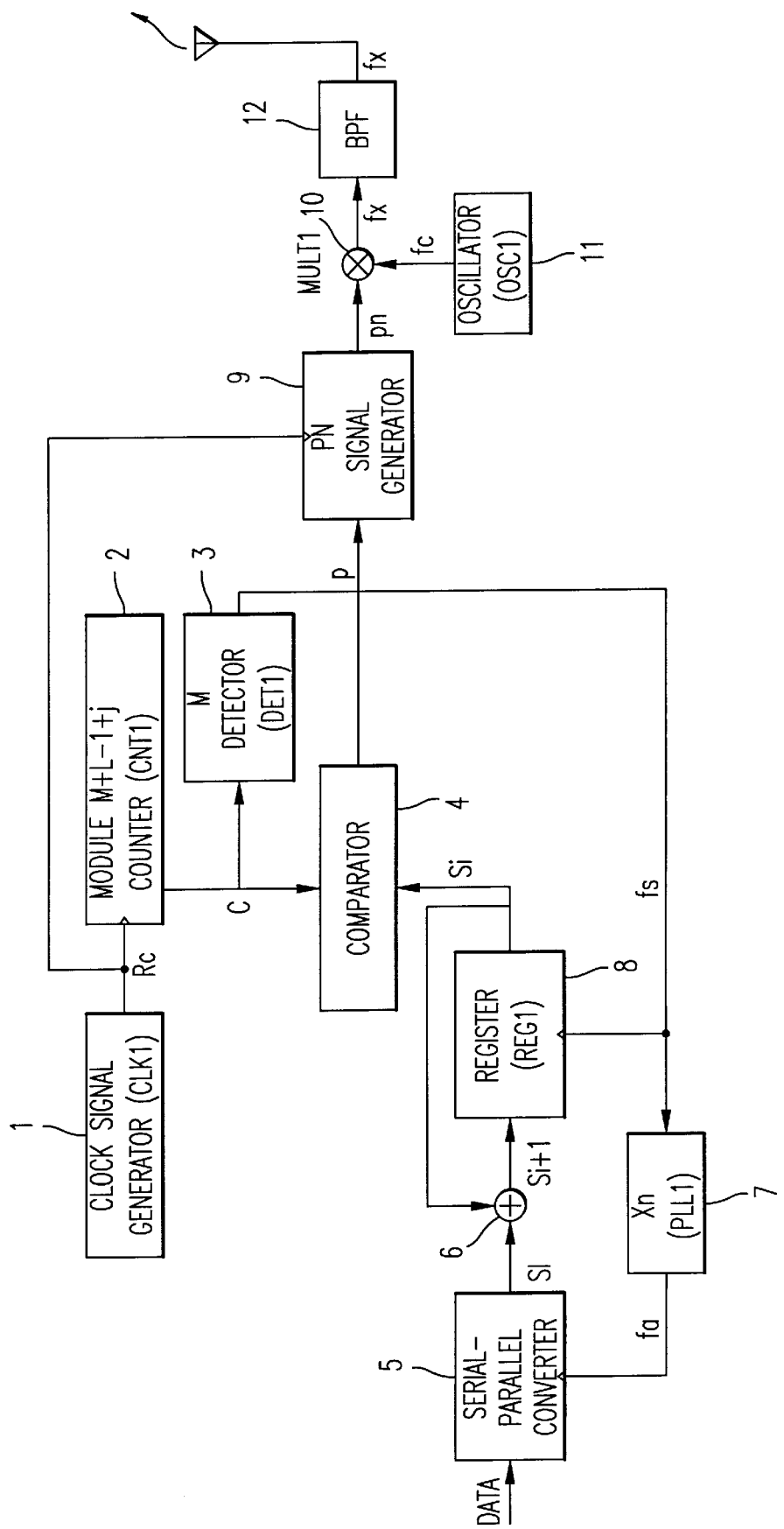
FIG. 2 shows a circuit diagram of a transmitter.
Figure 3:
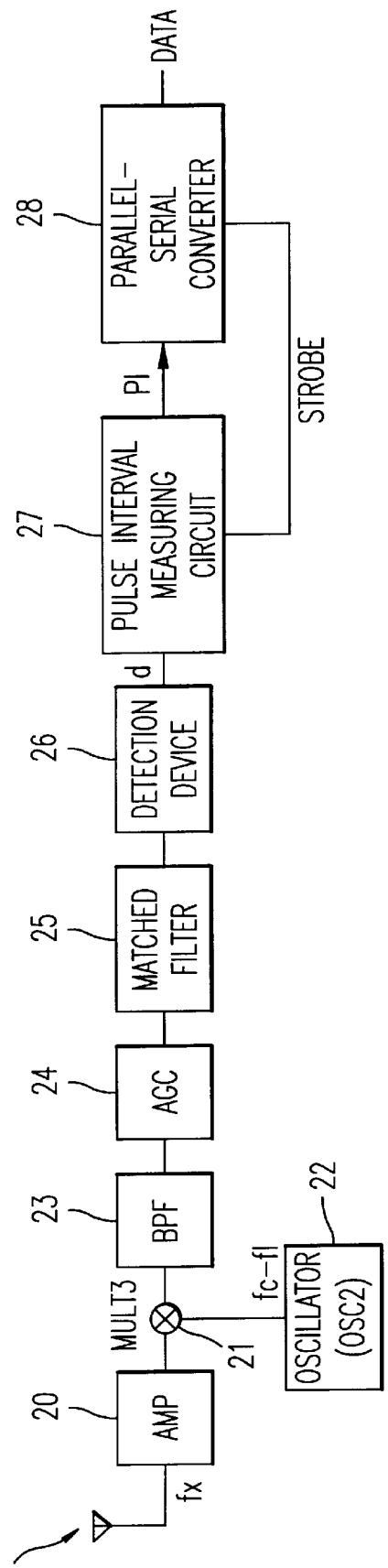
FIG. 3 shows a circuit diagram of a receiver.
Figure 4A:
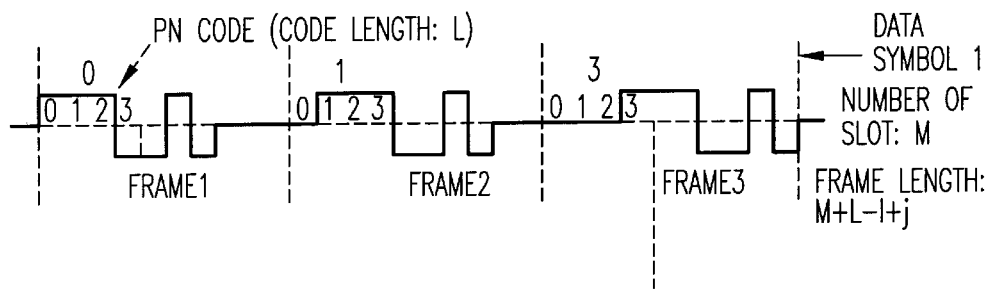
FIGS. 4A, 4B, 4C, 4D, 4E and 4F illustrate the principle of operation of a four-pole spread spectrum pulse position modulation system.

An arrangement and operation of an embodiment of the present invention will now be described. First, frame arrangements of modulated signals will be described. FIG. 4A shows a spread spectrum pulse position modulated signal for a data symbol 1 in a base band in the related art. This signal is a zero-phase signal. This figure shows an example where, as a pseudonoise code, the 7-chip Barker code of the pattern (+++--+-) is used, (data of the data symbol may be one of 0, 1, 2, 3) and the length of each frame is 10. These parameters are similar in the subsequent examples. Each space slot outputs zero. Accordingly, the output is 3 values: ±1 and 0.

The frame arrangement will now be described. For the M-value first data symbol 1 to be transmitted, frames are prepared, each frame including M+L−1+j slots. The slot rate of the frames is the same as the chip rate of the pseudonoise code. An encoded value is obtained by differentially encoding the data symbol value. Then one slot is selected from the consecutive M slots in a frame. The pseudonoise code is inserted into the L slots starting from the selected slot. Such a frame is consecutively generated, and, thus, the first spread spectrum pulse position modulated signal is generated.

Figure 4B:
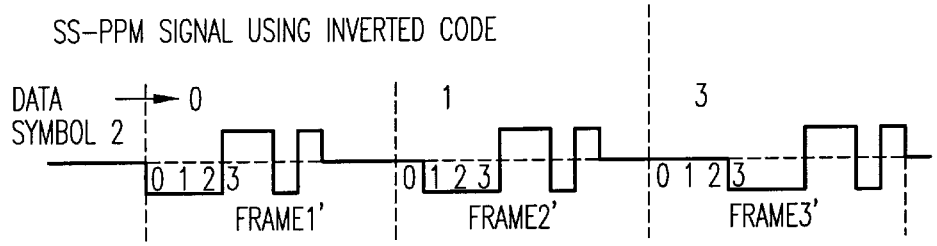

FIG. 4B shows a data symbol 2 which is modulated with the inverse of the pseudonoise code obtained from the pseudonoise signal used in the case of FIG. 4A. This signal is a $\pi$-phase signal. The resulting frame is offset compared to the beginning of the zero-phase signal.

Figure 4C:
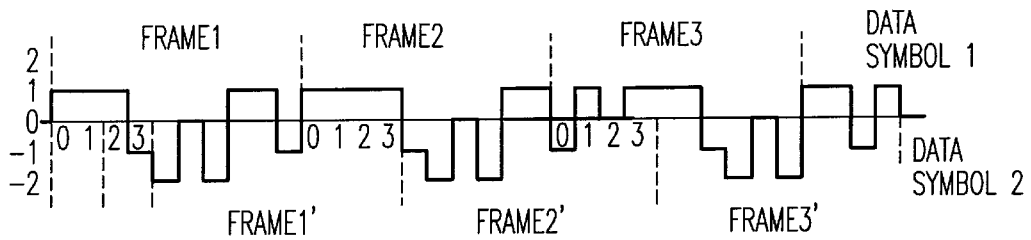

FIG. 4C shows a baseband signal resulting from adding together the modulated signals shown in FIGS. 4A and 4B. As a result of adding together the two 3-value signals (i.e., signals from the frame and the offset frame), the output of the resulting signal is 5 values: ±2, ±1 and 0. This signal is an I-channel baseband signal.

Figure 4D:
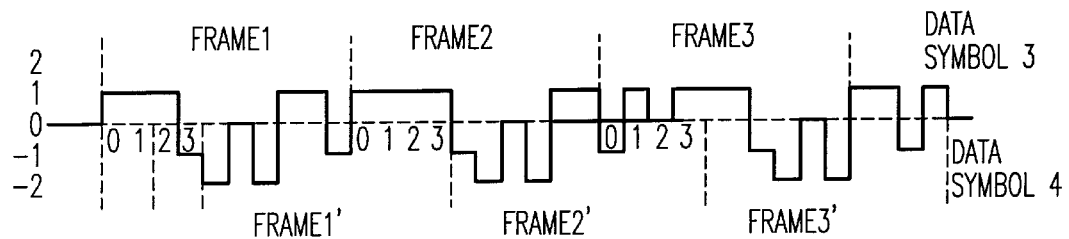
Figure 4E:
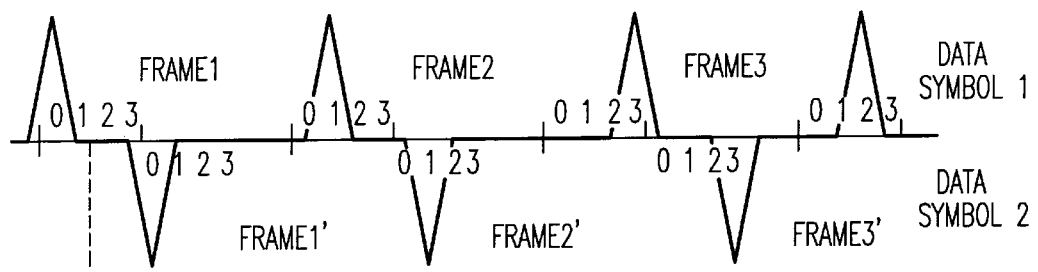
Figure 4F:
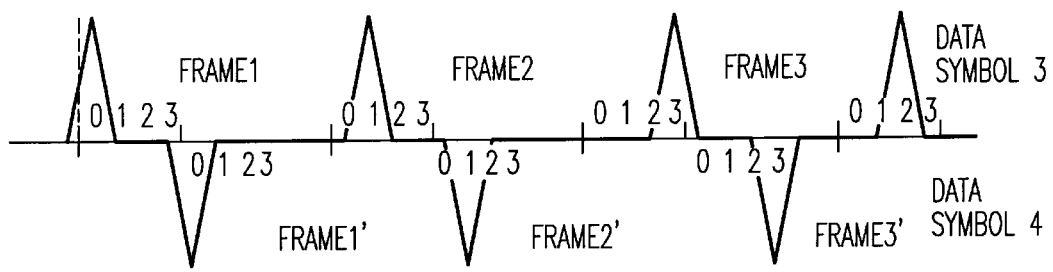

Also for a data symbol 3 and a data symbol 4, by using the pseudo code and the inverted code similarly, respectively, and adding together the resulting modulated signals, a modulated signal shown in FIG. 4D is generated. This signal is a Q-channel baseband signal.

The signals shown in FIGS. 4C and 4D are multiplied by two sine waves offset by 90°. Then, the resulting signals are added together. As a result, a spread spectrum pulse position modulated signal in which the four signals are multiplexed is generated.

On a reception side, first, the synchronized carrier wave is reproduced from the modulated signal, and quadrature detection is performed using the synchronized carrier wave. Thereby, the two-channel, I-channel (I-phase) and Q-channel (Q-phase), baseband signals are reproduced. Then, by causing these signals to pass through the matched filters, respectively, two two-pole pulse position modulated signals are reproduced. Then, by measuring the positive pulse intervals and the negative pulse intervals separately, pulse intervals for each of the four phases are measured independently. Thereby, the four data symbols can be reproduced.

Circuit arrangements and operations of a transmitter and receiver which perform communication using the spread spectrum signals of the frame formats described above in the embodiment of the present invention will now be described with reference to FIG. 5. Four data symbols M1, M2, M3 and M4, as information signals to be transmitted, are prepared by a serial-parallel converter 30. Each data symbol is input to a respective one of differential encoders $31_1$, $31_2$, $31_3$ and $31_4$, and differential-encoded data symbols M1', M2', M3' and M4' are output therefrom.

Four pulse position modulators $32_1$, $32_2$, $32_3$ and $32_4$ generate four-channel pulse position modulated signals as a result of selecting one slot of the consecutive M slots in each frame for the output value of each one of the differential encoders $31_1$, $31_2$, $31_3$ and $31_4$.

The pulse position modulated signal of each of channel 1 and channel 3 is used as a trigger signal. One period of a pseudonoise code of the period L is output into the L slots following the trigger signal by the respective one of pseudonoise code generators $33_1$ and $33_3$. Thus, two-channel spread spectrum pulse position modulated signals are generated. Further, the pulse position modulated signal of each of channel 2 and channel 4 is used as a trigger signal. One period of a polarity-inverted pseudonoise code of the period L is output into the L slots following the trigger signal by the respective one of pseudonoise code generators $33_2$ and $33_4$. Thus, two-channel spread spectrum pulse position modulated signals are generated.

Then, the output of the first pseudonoise code generator $33_1$ and the output of the second pseudonoise code generator $33_2$ are added together by an adder $34_1$ and thus an I-channel baseband signal is obtained. This signal is multiplied by a sine wave from an oscillator 36 through a multiplier $35_1$. Thus the signal is frequency-converted into an I-channel intermediate frequency signal. Similarly, the output of the third pseudonoise code generator $33_3$ and the output of the fourth pseudonoise code generator $33_4$ are added together by an adder $34_2$ and thus a Q-channel baseband signal is obtained. This signal is multiplied by the sine wave obtained from phase shifting, by a 90° phase shifter 37, a sine wave from the oscillator 36 through a multiplier $35_2$, and thus the signal is frequency-converted into a Q-channel intermediate frequency signal. The thus-obtained two intermediate frequency signals which are orthogonal to each other are added together by a third adder 38. Thus, a multiplexed spread spectrum pulse position modulated signal is generated. Further, it may be that, if necessary, an RF frequency converting and amplifying portion 39 is used to frequency-convert and amplify the modulated signal to make it a transmission signal.

Figure 6:
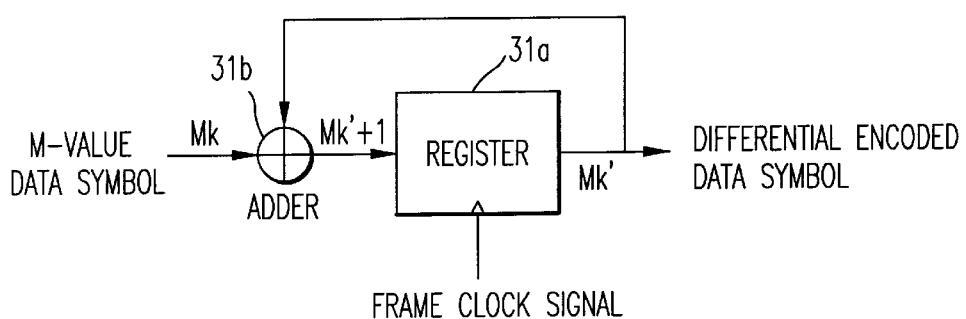
FIG. 6 shows an example of a differential encoding circuit.

FIG. 6 shows a specific example of a differential encoder 31 ($31_1$, $31_2$, $31_3$ and $31_4$). As shown in the figure, a register 31a which operates in synchronization with a frame clock signal is provided. An adder 31b adds together the output of the register 31a and the value of an M-value data symbol to be transmitted. The thus-obtained value is fed back to the register 31a, and thus, the subsequent register value is determined. Thus, differential encoding is performed. At this time, when the addition result is equal to or more than M, the result is divided by M and the remainder is used as the register value. In a case of binary calculation, a carry bit is ignored.

Figure 7:
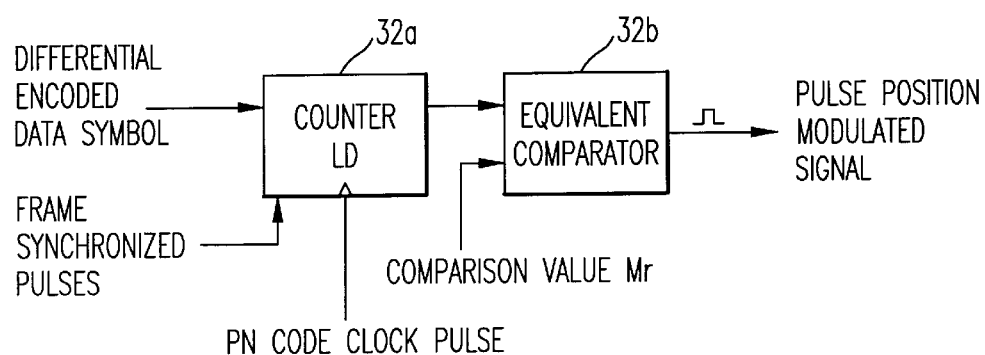
FIG. 7 shows an example of a pulse position modulator.

FIG. 7 shows a specific example of a pulse position modulator 32 ($32_1$, $32_2$, $32_3$ and $32_4$). A parallel-input counter 32a which operates in synchronization with a PN code clock signal is provided. The counter 32a reads the differential encoded data symbol where a frame synchronized pulse which occurs for each frame is used as the trigger signal. Then, counting is continued, and the count output is input to an equivalent comparator 32b. The equivalent comparator 32b outputs a pulse each time that the count output agrees with a comparison value Mr. Thus, a pulse position modulated signal can be generated.

Figure 8:
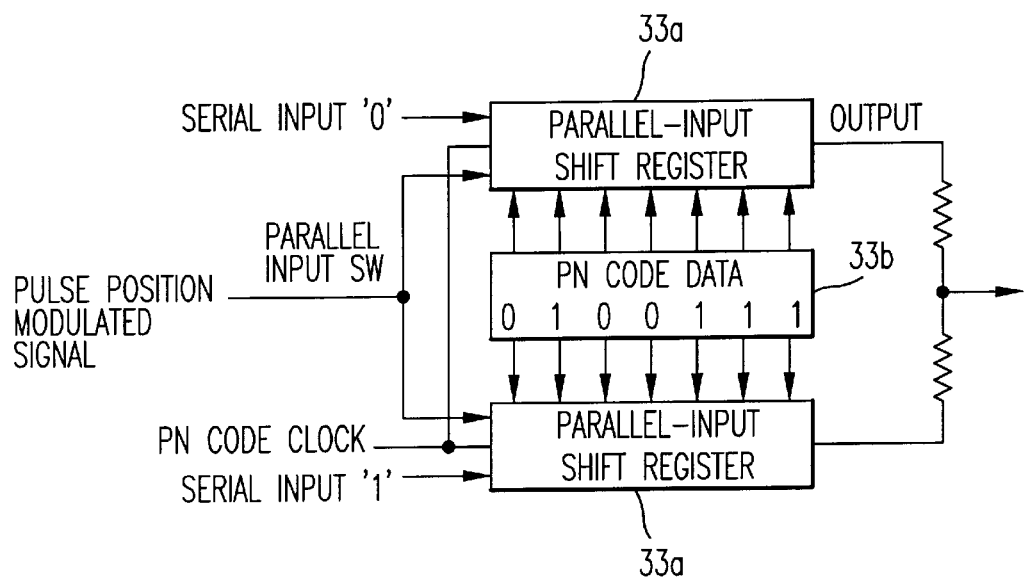
FIG. 8 shows an example of a PN code generator.

FIG. 8 shows a specific example of the PN code generator 33 ($33_1$, $33_2$, $33_3$ and $33_4$). Two parallel-input shift registers 33a, 33a are provided. Each shift register 33a operates in synchronization with the PN code clock signal and has a number of steps corresponding to the code length of the PN code. The same PN code pattern data 33b is input to the parallel input terminals of the shift registers 33a by ROM or switches. One of the serial inputs of the two shift registers 33a, 33a is 0 and the other is 1. Ordinarily, a shifting operation of the serial inputs is performed. Thereby, the addition result of the outputs of the two registers through resistors is the intermediate value between 0 and 1. The parallel input operation is performed where the pulse position modulated signal is used as the trigger signal. Thereby, one period of the pseudo code data (1110010 in the figure) occurs in the outputs of the two registers, and the addition result also becomes (1110010). Thereby, the 3-value spread spectrum pulse position modulated signal is generated.

Figure 9:
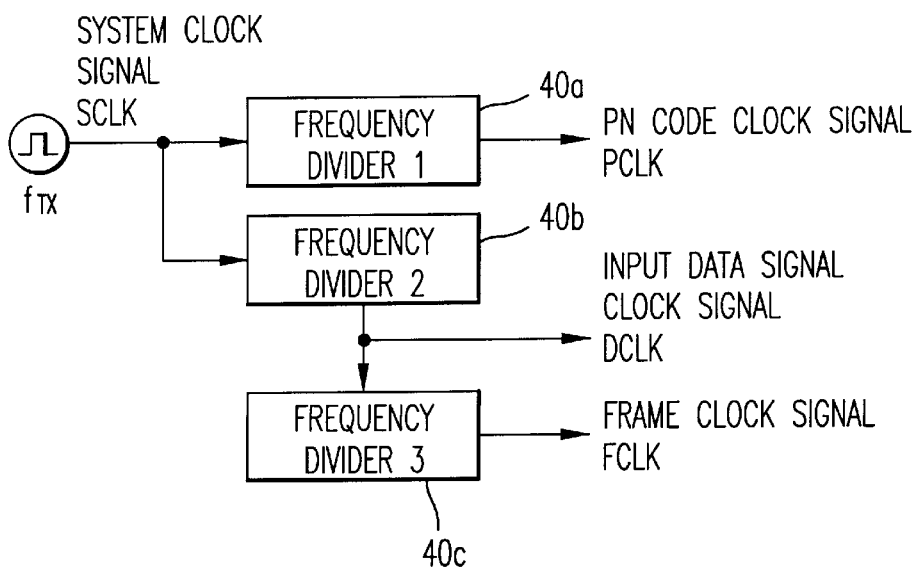
FIG. 9 shows a clock signal generating circuit.

In the example of FIG. 5, three synchronized clock signals are used as operation clock signals of the transmitter. For this purpose, a clock generating circuit 40 generates, based on a clock signal (SCLK) from a reference oscillator, the PN (pseudonoise) code clock signal (PCLK), the frame clock signal (FCLK) and an input data signal clock signal (DCLK). FIG. 9 shows an example of an arrangement of the clock signal generator. As shown in FIG. 9, the clock signal (SCLK) from the reference oscillator is input to a frequency divider 40a and a frequency divider 40b. Thus, PCLK and DCLK are produced. Further, frequency dividing is performed on DCLK by a frequency divider 40c, and thus FCLK is generated. The frequency dividing ratio of each frequency divider is set so that the following conditions are fulfilled: DCLK=FCLK X K, PCLK=FCLK X (frame length), where K represents the number of transmitting bits for each frame. There is a case where the frequency divider 40a is not needed.

In the transmitter shown in FIG. 5, the serial-parallel converter 30 is provided, and thereby, data input is performed in series and a fixed number of serial data is converted into four data symbols M1, M2, M3 and M4.

Specifically, a parallel output shift register operates by the input data clock signal (DCLK), the shift register reads data to be transmitted one by one from the serial input, and the read data is output in parallel for each frame where the frame clock signal is used as the trigger signal. The output is divided into four divisions, and thus the four data symbols M1, M2, M3 and M4 are generated. The generated data symbols are input to the differential encoders 1, 2, 3 and 4, respectively. By using the input data symbols, the spread spectrum pulse position modulation signals are generated. When considering data transmission efficiency, it is preferable that powers of 2 are used for the values of M1, M2, M3 and M4.

Figure 10:
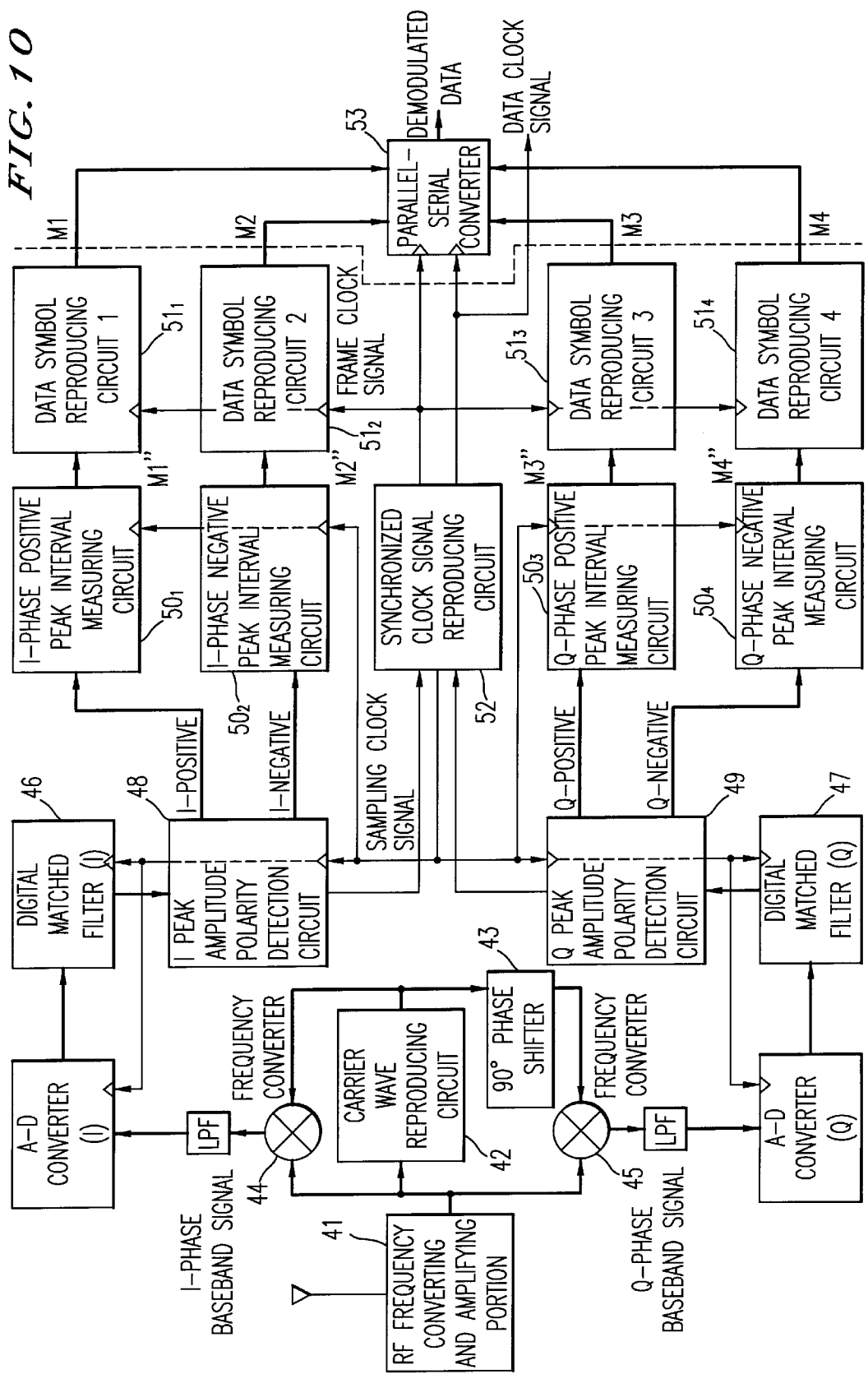
FIG. 10 illustrates an example of a (synchronous) four-pole SS-PPM system receiver.

With reference to FIG. 10, the spread spectrum pulse position modulation receiver in the embodiment will now be described. This receiver receives the signal from the above-described spread spectrum pulse position modulation transmitter, and reproduces the original data symbols M1, M2, M3 and M4.

In FIG. 10, an RF frequency converting and amplifying portion 41 amplifies the received signal from the transmitter and converts it into an intermediate frequency signal, if necessary. The intermediate frequency signal is input to a carrier wave reproducing circuit 42 which generates a reproduced carrier wave. Phase shifting by 90° is performed on the reproduced carrier wave through a phase shifter 43. Thus, two reproduced carrier waves which are orthogonal to each other are obtained. The intermediate frequency signal is input to two frequency converters 44 and 45 which use the reproduced carrier waves which are orthogonal to each other. Thus, quadrature detection is performed, and thereby, the intermediate frequency signal is converted into 2 channels (i.e., I and Q) of baseband signals.

Each of the two baseband signals are input to the respective one of matched filters 46 and 47 which match the same pseudonoise code as that of the transmitter. Thereby, pulse position modulated signals including positive and negative pulses are reproduced through the matched filters 46 and 47. Then, peak amplitude polarity detection circuits 48 and 49 detect the positive pulses and the negative pulse separately from the outputs of the matched filters 46 and 47. Thus, the peak amplitude polarity detection circuits 48 and 49 output two peak detection signals.

Four peak detection signals are obtained for indicating positive and negative peak detection for each of the I channel and Q channel. Based on the four peak detection signals, four peak interval measuring circuits 50 ($50_1$, $50_2$, $50_3$ and $50_4$) measure peak interval times of each signal. Thus, measurement data is output. Based on the measurement data, four data symbol reproducing circuits 51 ($51_1$, $51_2$, $51_3$ and $51_4$) calculate the original data symbol values which are output in parallel as demodulated data.

Figure 11:
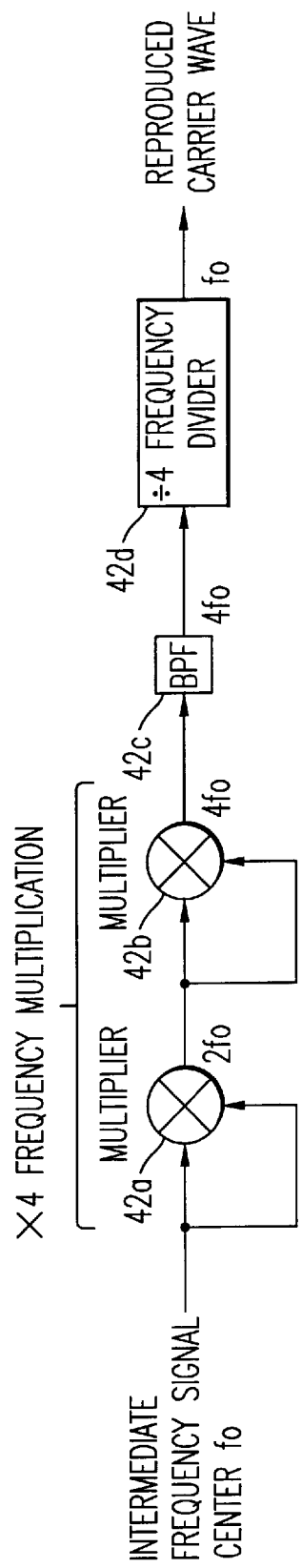
FIG. 11 shows an example of a carrier wave reproducing circuit.

FIG. 11 shows a specific example of the carrier wave reproducing circuit 40 shown in FIG. 10. The modulated signal in this system can be considered as a sort of a signal resulting from 4-phase phase modulation. Accordingly, when frequency multiplication by four is performed on the signal, a sine wave without data modulation can be obtained. Then, frequency division by four is performed on the resulting signal. It is possible to reproduce a carrier wave which is in synchronization with the received signal. For this purpose, in the arrangement shown in FIG. 11, the intermediate frequency signal is input to the two input terminals of a multiplier 42a. Thereby, a ×2 frequency multiplied wave is generated. Then, ×2 frequency multiplication is performed on this wave by a multiplier 42b, and thereby, the ×4 frequency multiplied wave is generated. This wave passes through a bandpass filter 42c, and unnecessary frequency components are removed. Then, a frequency divider 42d divides the frequency by four so that the frequency of the resulting signal be ¼. Thus, the original carrier wave is reproduced.

The arrangements of the matched filters 46 and 47 shown in FIG. 10 will now be described. There are two types of matched filters. One type of matched filter is an analog matched filter which uses a Surface Acoustic Wave (SAW) device or a Charge-Coupled Device (COD). The other type of matched filter is a digital matched filter. First, an A-D converter is used for converting an analog signal to a digital signal which the digital matched filter processes. Digital signal processing forms the digital matched filter.

Figure 12:
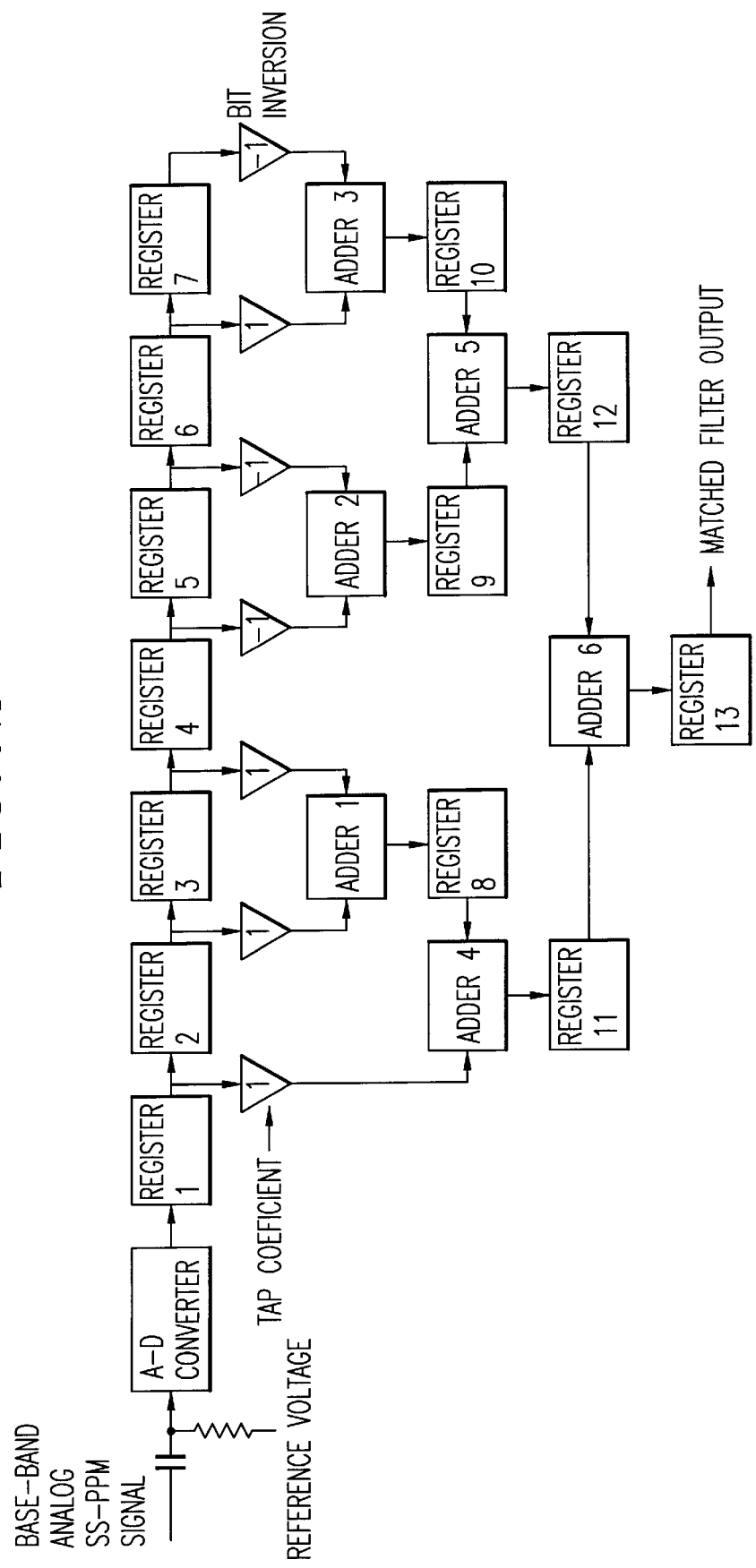
FIG. 12 shows an example of a digital matched filter.

In the embodiment, shown in FIG. 10, the digital matched filters 46 and 47 are used. FIG. 12 shows a specific example of each of the digital matched filters 46 and 47. First, the A-D converter converts the analog signal to the digital signal. Registers are provided for storing the thus-obtained digital data through one period of the pseudonoise code. For this purpose, the number of the registers is an integer times the length of the pseudonoise code (for the number of times of sampling during each slot). The registers are connected in series and, for each system clock pulse, all the register outputs are taken out. The outputs that are taken out are multiplied by tap coefficients which are determined in accordance with the pattern of the pseudonoise code. By adding the multiplied outputs together in sequence, the matched filter output can be obtained. When the pseudonoise code of the same pattern as the tap coefficients is input, the values of the input code are read in the registers in sequence. Then, at a certain time, the phase of the input code is coincident with the phase of the tap coefficients. As a result, all of the input data to the adders is positive or negative, and thus, the matched pulse occurs.

Figure 13:
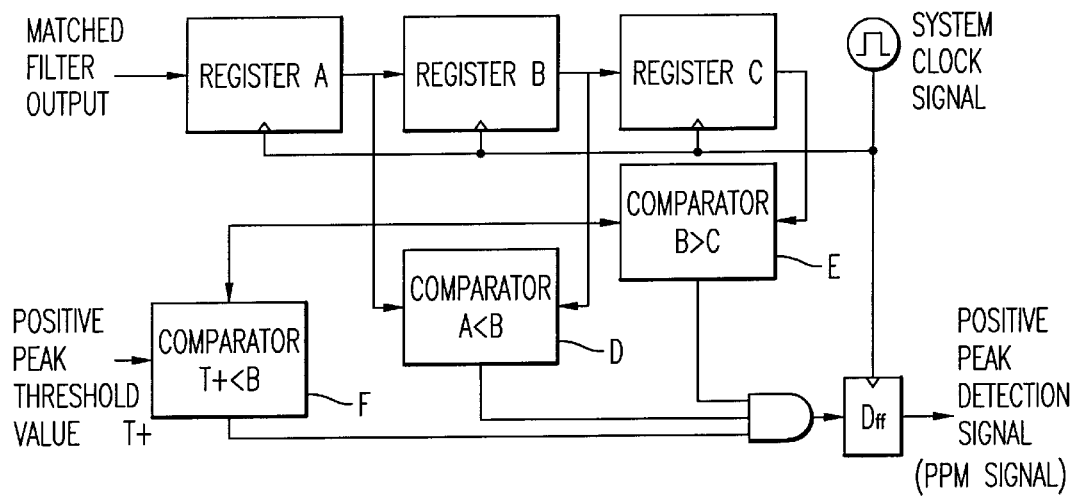
FIG. 13 shows an example of a positive peak detecting circuit.

FIG. 13 shows a specific example of each of the peak amplitude polarity detection circuits 48 and 49. The arrangement shown in FIG. 13 is a digital circuit example in which only positive peaks are detected. The system is considered in which sampling of matched pulses is performed at the rate of twice the frequency of the pseudonoise code clock signal in the transmitter. The matched pulse data or the output data of the matched pulse filter is read in a register A. Then, for each clock pulse of the system clock signal, the read-in data is transferred from the register A to a register B, from the register B to a register C, in sequence. Thus, three consecutive sampling data are always stored in the registers. In this example, the value of the register B is compared with the value of each of the registers at the two sides by the respective one of comparators D and E. Further, the value of the center register B is compared with a positive peak threshold value by a comparator F. Then, only when the value of the register B is larger in each of the three comparisons, it is determined that a positive peak occurs and a positive peak detection signal is output. When a negative peak is detected, outputs of the comparators should be inverted, and the sign of the threshold value should be inverted. By providing two circuits, it is possible to detect positive peaks and negative peaks separately.

Figure 14:
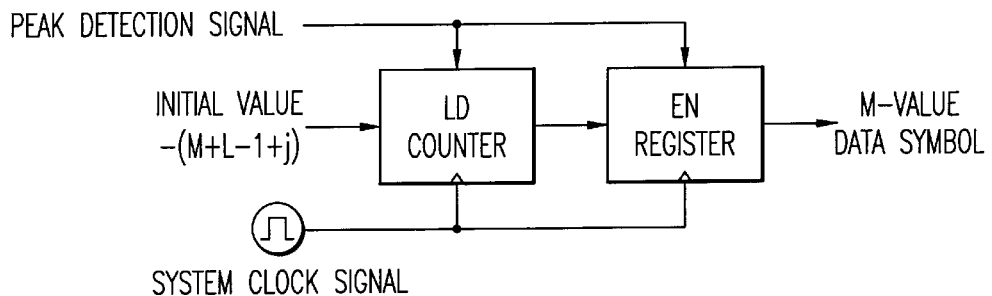
FIG. 14 shows an example of a peak interval measuring and data symbol reproducing circuit.

Various circuit formations are considered for the pulse interval measuring circuits 50 ($50_1$, $50_2$, $50_3$ and $50_4$) and data symbol reproducing circuits 51 ($51_1$, $50_2$, $50_3$ and $50_4$). FIG. 14 shows an example. The circuit shown in FIG. 14 includes a counter and a register. The peak detection signal from the peak detection circuit is input to the counter and register in parallel. The count value at this time is stored in the register as the peak interval measurement value. When the peak detection signal is not input, only the counter performs the counting operation in synchronization with the system clock signal. In this example, by giving an initial value of $-(M+L-1+j)$, the value after one frame has been counted is the original data symbol value. Thus, the pulse interval measuring circuit also acts as the data symbol reproducing circuit.

Figure 15:
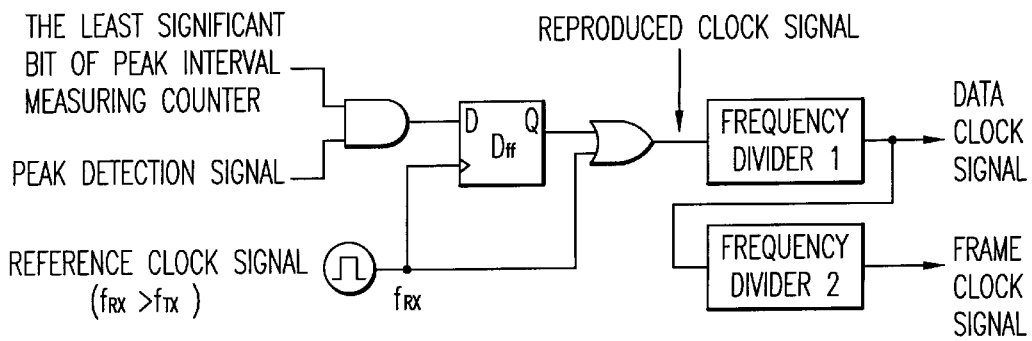
FIG. 15 shows an example of a synchronized clock signal reproducing circuit.

In the example of FIG. 10, the synchronized clock signal reproducing circuit 52 generates the sampling clock signal, frame clock signal and data clock signal which are used in the receiver. The frame clock signal and data clock signal should be in synchronization with the data clock signal in the transmitter. Accordingly, clock signal reproduction is necessary. FIG. 15 shows an example of the synchronized clock signal reproducing circuit 52. In this example, it is considered that the sampling frequency is twice the frequency of the pseudonoise code clock signal of the transmitter. A reference clock signal is prepared, the frequency of which is slightly higher than the frequency of the reference clock signal of the clock signal generating circuit 40 of the transmitter. An AND operation is performed on the least significant bit of the counter of the peak interval measuring circuit 50 and the peak detection signal. Thereby, leading of the clock signal in the receiver is detected. The result of the AND operation is input to a D-flip-flop. Thereby, a signal which is at a high level only for one clock pulse is generated. An OR of this signal and the reference clock signal is obtained and only one pulse is deleted. Thereby, the sampling clock signal which is approximately in synchronization with the clock signal in the transmitter is reproduced. Frequency division is performed on the reproduced signal by two frequency dividers. Thus, the synchronized data clock signal and the synchronized frame clock signal are reproduced.

A spread spectrum pulse position modulation receiver in an alternate embodiment of the receiver in the above-described embodiment will now be described. In the receiver in the alternate embodiment, after receiving the modulated signal from the above described transmitter, instead of the carrier wave being reproduced and the received signal being converted into the complete baseband signal as in the receiver in the above-described embodiment, the received signal is converted into a quasi-baseband signal including an offset carrier wave using an asynchronous local oscillator which provides a wave near the carrier wave. The influence of the offset is canceled in a spread spectrum pulse position modulation demodulating portion. In this arrangement in the alternate embodiment, in a high-frequency portion, carrier wave synchronization reproduction is not needed. Accordingly, manufacturing of a high frequency circuit is easier. However, the demodulating portion is more complicated.

Figure 16:
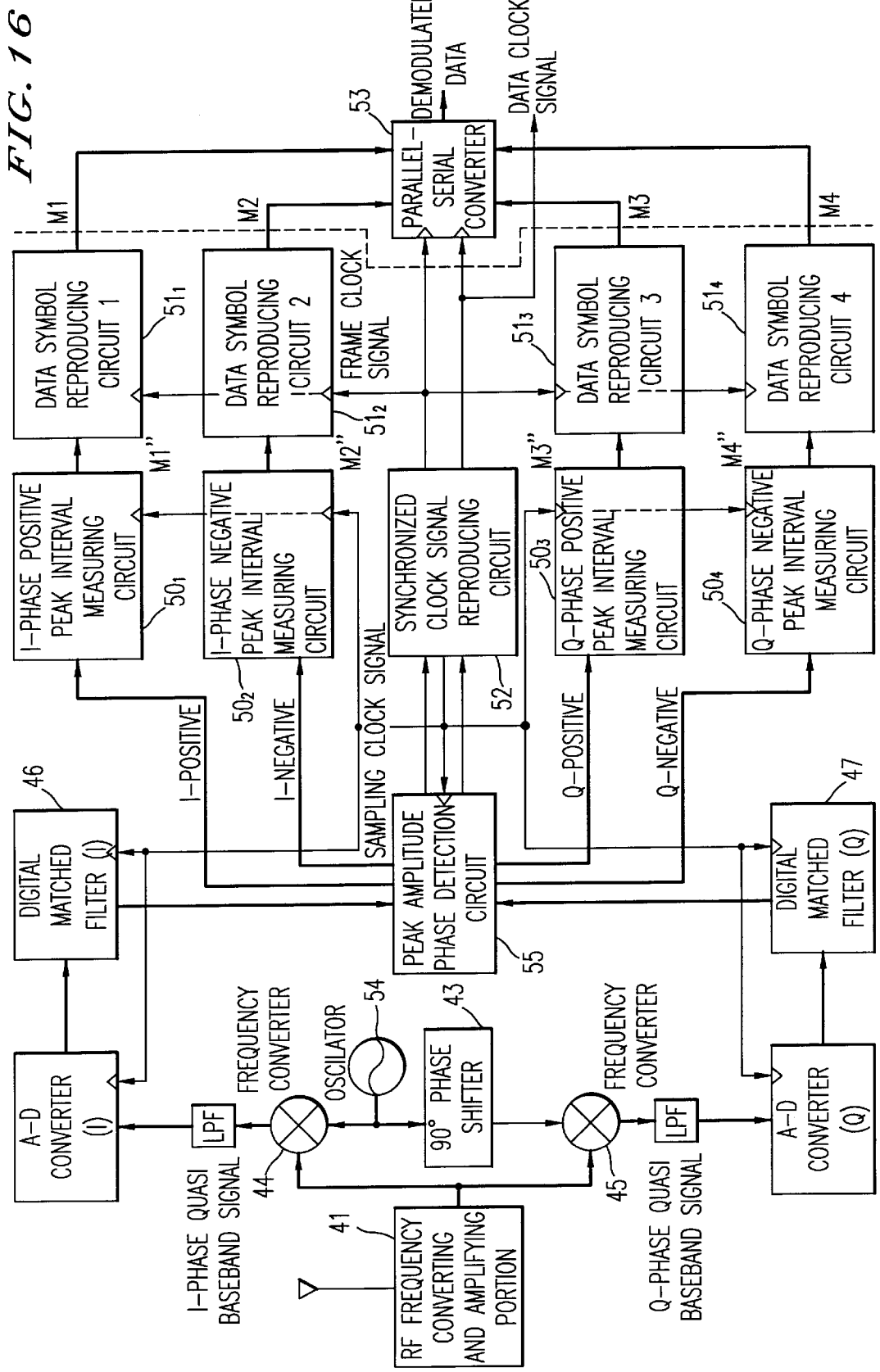
FIG. 16 illustrates an example of an asynchronous four-pole SS-PPM system receiver.

With reference to FIG. 16, the receiver in the alternate embodiment will be described. The received signal from the transmitter is amplified and converted into the intermediate frequency signal by an RF frequency converting and amplifying portion 41, if necessary. An oscillator 54 of a frequency approximately equal to the center frequency of this intermediate frequency signal is provided. The oscillation output of this oscillator 54 is multiplied by the above-mentioned intermediate signal by a multiplier 44. The output obtained from performing 90° phase shifting on the output of the oscillator 54 is multiplied by the above-mentioned intermediate signal by a multiplier 45. Thus, the I-phase quasi-baseband signal and Q-phase quasi-baseband signal, each including a carrier wave offset, are generated. Thus, quadrature detection is performed.

When the two quasi-baseband signals are input to matched filters 46 and 47, each of which matches the same pseudonoise code as that of the transmitter, respectively, pulse position modulated signals are reproduced, respectively, as the filter outputs. Each of these pulse position modulated signals includes positive and negative pulses which were amplitude modulated by the offset frequency sine wave.

A following peak amplitude phase detection circuit 55 detects a total of 4 channels of pulses separately and outputs 4 peak detection signals. The detected 4 channels of pulses are I-channel positive pulses and negative pulses, and Q-channel positive pulses and negative pulses from the two matched filters.

Then, in the same arrangement as that of the receiver shown in FIG. 10, based on the 4 peak detection signals, peak interval measuring circuits 50 ($50_1$, $50_2$, $50_3$ and $50_4$) measure peak interval times, respectively. Based on the thus-measured values, data symbol reproducing circuits 51 ($51_1$, $51_2$, $51_3$ and $51_4$) calculate the original 4 data symbol values, respectively. The calculated data symbol values are output in parallel as the demodulated data.

In the receiver shown in FIG. 16, the matched filters 46 and 47, peak interval measuring circuits 50 ($50_1$, $50_2$, $50_3$ and $50_4$) and data symbol reproducing circuits 51 ($51_1$, $51_2$, $51_3$ and $51_4$) were described in the descriptions of the receiver shown in FIG. 10. The peak amplitude phase detection circuit 55 will now be described. The peak amplitude phase detection circuit 55 includes an amplitude calculating circuit, a peak detecting circuit and a phase detecting circuit. The peak detecting circuit was described with reference to FIG. 13.

Figure 17:
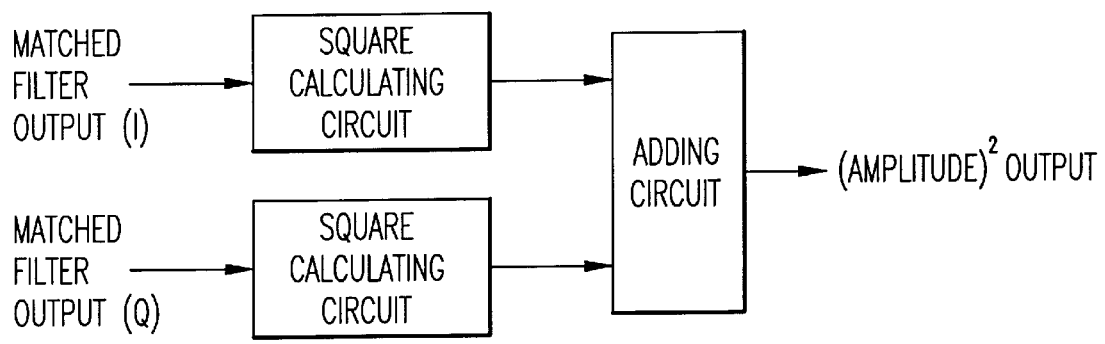
FIG. 17 shows an example of an amplitude calculating circuit.

FIG. 17 shows a specific example of the amplitude calculating circuit. In this circuit, each of the outputs from the two digital matched filters is squared by the respective one of two square calculating circuits (digital multipliers). The outputs of the square calculating circuits are added together. Thereby, matched pulse amplitude squared values are obtained. By using these signals in peak detection, peak detection independent of phase rotation due to the offset carrier wave can be performed.

Figure 18:
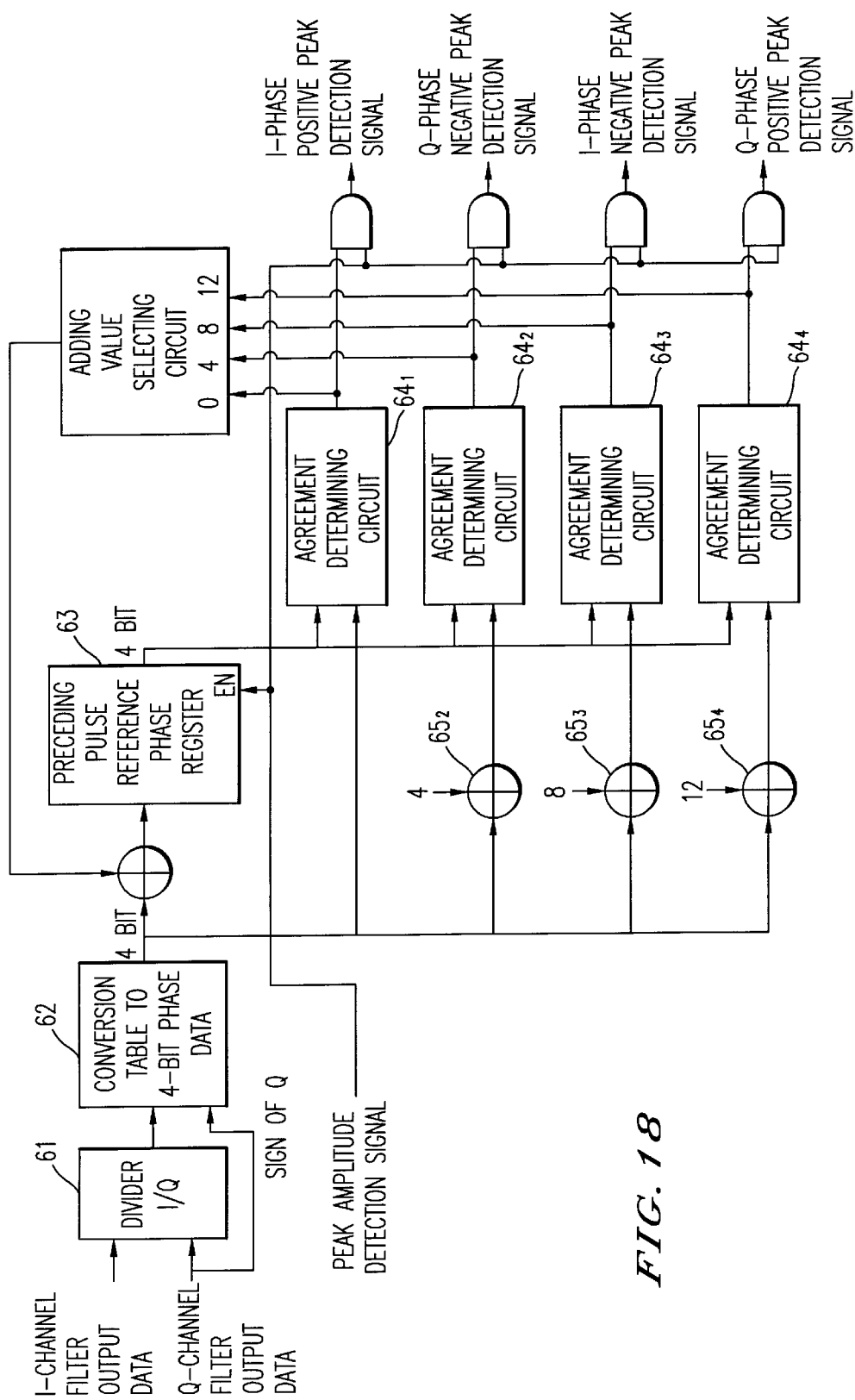
FIG. 18 shows an example of a phase detecting circuit.

FIG. 18 shows a specific example of the phase detecting circuit. In this circuit, the phase is divided into 16 phases. Using the I-phase and Q-phase two matched filter outputs (hereinafter, referred to as 'I' and 'Q'), I÷Q is obtained through a dividing circuit 61. From the thus-obtained value and the sign of Q, using a conversion table 62 to phase data, 4-bit (16 values) phase data is obtained. Then, a 4-bit register 63 is provided for storing the reference I-phase positive peak phase value. The register 63 is driven by the peak amplitude detection signal. The output value of the register 63 is compared with the output value of the conversion table 62 through an agreement determining circuit $64_1$. If the difference therebetween is equal to or less than 1, it is determined that the two values are in agreement and an agreement signal is output. Then, an AND operation is performed on the agreement signal and the peak amplitude detection signal. Thus, the I-phase positive peak detection signal is generated. At this time, by the peak amplitude detection signal, the output data of the conversion table 62 of this time is read in the phase register 63. Similarly, through a second agreement determining circuit $64_2$, the output value of the register 63 is compared with the result of adding 4 to the output value of the conversion table 62 through an adder $65_2$. If the difference therebetween is equal to or less than 1, it is determined that the two values are in agreement and an agreement signal is output. Then, an AND operation is performed on the agreement signal and the peak amplitude detection signal. Thus, the Q-phase negative peak detection signal is generated. At this time, by the peak amplitude detection signal, the value obtained from adding 4 to the output data of the conversion table 62 of this time is read in the phase register 63. Similarly, through a third agreement determining circuit $64_3$, the output value of the register 63 is compared with the result of adding 8 to the output value of the conversion table 62 through an adder $65_3$. If the difference therebetween is equal to or less than 1, it is determined that the two values are in agreement and an agreement signal is output. Then, an AND operation is performed on the agreement signal and the peak amplitude detection signal. Thus, the I-phase negative peak detection signal is generated. At this time, by the peak amplitude detection signal, the value obtained from adding 8 to the output data of the conversion table 62 of this time is read in the phase register 63. Similarly, through a fourth agreement determining circuit $64_4$, the output value of the register 63 is compared with the result of adding 12 to the output value of the conversion table 62 through an adder $65_4$. If the difference therebetween is equal to or less than 1, it is determined that the two values are in agreement and an agreement signal is output. Then, an AND operation is performed on the agreement signal and the peak amplitude detection signal. Thus, the Q-phase positive peak detection signal is generated. At this time, by the peak amplitude detection signal, the value obtained from adding 12 to the output data of the conversion table 62 of this time is read in the phase register 63. Because the offset value added to the phase register is changed depending on which one of the four agreement determining circuits has agreement therein, as shown in the figure, an offset value selecting circuit is provided.

In each of the arrangements shown in FIGS. 10 and 16, a parallel-serial converter 53 converts the 4 demodulated data symbols into the serial data.

In the above-described spread spectrum pulse position modulation communication system, including transmitter and receivers, it is possible that the Barker code is used as the pseudonoise code in spread modulation. Because the Barker code is a finite-length code, in a system such as the present invention in which the pseudonoise code is used for each period, cross-correlation characteristics can be reduced in comparison to an ordinary period code such as an M code. Pattern examples of the Barker code are 7 chips of (1, 1, 1, −1, −1, 1, −1), 11 chips of (1, 1, 1, −1, −1, −1, 1, −1, −1, 1, −1) and so forth.

In transmitter and receivers of the above-described spread spectrum pulse position modulation communication system, it is possible that the value of the frame length (M+L−1+j) is at least twice the maximum value M of the values which each data symbol can have. Thereby, in one frame, the slot positions do not overlap between the data symbols M1 and M2 and between the data symbols M3 and M4. Thereby, a positive peak and a negative peak do not overlap in the matched filter of the receiver along the time axis. Thus, demodulation can be easier.

Further, the present invention is not limited to the above-described embodiments, and variations and modifications may be made without departing from the scope of the present invention claimed in the following claims.

What is claimed is:

1. A spread spectrum pulse position modulation communication system, comprising:

a pseudonoise generator for generating a pseudonoise code;

an inverter for inverting the pseudonoise code to form an inverted pseudonoise code;

plural modulators for modulating (1) first and third signals by the pseudonoise code to form first and third spread spectrum pulse position modulated signals and (2) second and fourth signals by the inverted pseudonoise code to form second and fourth spread spectrum pulse position modulated signals;

a first adder for adding the first and second spread spectrum pulse position modulated signals to form a fifth spread spectrum pulse position modulated signal;

a second adder for adding the third and fourth spread spectrum pulse position modulated signals to form a sixth spread spectrum pulse position modulated signal; and a quadrature modulator for modulating said fifth and sixth spread spectrum pulse position modulated signals.

2. A spread spectrum pulse position modulation communication system, comprising:

a frame generator for generating plural frames and plural offset frame, each frame and offset frame including (M+L−1+j) slots, wherein L is a period of a pseudonoise code and an inverted code obtained from inverting the pseudonoise code, M is a maximum value for each data symbol transmitted in each frame and offset frame, and a slot rate of each frame and offset frame is equal to a chip rate of the pseudonoise code;

a data input for receiving (1) first and second data symbols which are inserted into a first frame and a first offset frame, respectively, and (2) third and fourth data symbols which are inserted into a second frame and a second offset frame, respectively;

a first selector for selecting a starting slot in the first frame and the first offset frame and for inserting the pseudonoise code into the L consecutive slots starting at the starting slot in the first frame and for inserting the inverted pseudonoise code into the L consecutive slots starting at the starting slot in the first offset frame;

a first adder for adding values in the slots of the first frame and the first offset frame when the pseudonoise code and the inverted pseudonoise code overlap to form an I-channel baseband signal;

a second selector for selecting the starting slot in the second frame and the second offset frame and for inserting the pseudonoise code into the L consecutive slots starting at the starting slot in the second frame and for inserting the inverted pseudonoise code into the L consecutive slots starting at the starting slot in the second offset frame;

a second adder for adding values in the slots of the second frame and the second offset frame when the pseudonoise code and the inverted pseudonoise code overlap to form a Q-channel baseband signal;

a first multiplier for multiplying the I-channel baseband signal by a first carrier wave;

a second multiplier for multiplying the Q-channel baseband signal by a second carrier wave that has a 90 degree phase difference with the first carrier wave;

a third adder for adding together outputs of the first and second multipliers, wherein the first frame and the first offset frame are offset by at least one slot and wherein the first frame and the second frame are aligned with respect to time.

3. The system according to claim 2, further comprising:

plural differential encoders for receiving the first through fourth data symbols and generating first through fourth encoded data symbols;

plural pulse position modulation circuits for modulating the first through fourth encoded data symbols to form first through fourth pulse position modulated signals;

a first pseudonoise code generator for outputting to the first selector one period of the pseudonoise code when triggered by the first pulse position modulated signal;

a second pseudonoise code generator for outputting to the first selector one period of the inverted pseudonoise code when triggered by the second pulse position modulated signal;

a third pseudonoise code generator for outputting to the second selector one period of the pseudonoise code when triggered by the third pulse position modulated signal;

a fourth pseudonoise code generator for outputting to the second selector one period of the inverted pseudonoise code when triggered by the fourth pulse position modulated signal;

wherein the first adder adds together outputs of said first and second pseudonoise code generators to form the I-channel baseband signal;

wherein the second adder adds together outputs of said third and fourth pseudonoise code generators to form the Q-channel baseband signal.

4. The system according to claim 3, wherein the data input comprises a serial-parallel converter which receives data in serial and converts the data into the first through fourth data symbols.

5. The system according to claim 3, further comprising:

an RF frequency converter and amplifier for performing frequency conversion on the modulated signal and amplifying the converted signal to form a transmission signal.

6. The spread spectrum pulse position modulation communication system according to claim 2, wherein a Barker code is used as the pseudonoise code.

7. The system according to claim 2, wherein a number of sots per frame is at least twice the maximum value M.

* * * * *